(12) United States Patent
van Voorst Vader et al.

(10) Patent No.: US 12,363,410 B2
(45) Date of Patent: Jul. 15, 2025

(54) PARALLAX CORRECTION FOR ILLUMINATION SYSTEM AND METHOD

(71) Applicant: Lumileds LLC, San Jose, CA (US)

(72) Inventors: Pieter Johannes Quintus van Voorst Vader, Eindhoven (NL); Arjen Gerben Van der Sijde, Eindhoven (NL); Nicola Bettina Pfeffer, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 380 days.

(21) Appl. No.: 18/104,084

(22) Filed: Jan. 31, 2023

(65) Prior Publication Data

US 2023/0254563 A1 Aug. 10, 2023

Related U.S. Application Data

(60) Provisional application No. 63/306,700, filed on Feb. 4, 2022.

(51) Int. Cl.
*H04N 23/56* (2023.01)
*H04N 23/67* (2023.01)

(52) U.S. Cl.
CPC ........... *H04N 23/56* (2023.01); *H04N 23/675* (2023.01)

(58) Field of Classification Search
CPC .... H04N 23/56; H04N 23/675; H04N 23/673; H04N 23/74; H04N 23/54; H04N 23/65;
(Continued)

(56) References Cited

U.S. PATENT DOCUMENTS

2002/0080237 A1 6/2002 Keitel et al.
2008/0231742 A1\* 9/2008 Kurase ................... G03B 15/05
348/E5.022

(Continued)

FOREIGN PATENT DOCUMENTS

JP 2003177326 A 6/2003
WO 2021198269 A1 10/2021

OTHER PUBLICATIONS

"International Application Serial No. PCT/US2023/012019, International Search Report mailed May 17, 2023", 4 pgs.
(Continued)

*Primary Examiner* — Abdelaaziz Tissire
(74) *Attorney, Agent, or Firm* — Schwegman, Lundberg & Woessner, P.A.

(57) ABSTRACT

An imaging system can automatically measure a distance to an object. A camera, having a field of view that includes the object, can define a camera longitudinal axis that extends to a center of the field of view. An illuminator, defining an illuminator longitudinal axis that is substantially parallel to the camera longitudinal axis and is laterally offset from the camera longitudinal axis, can illuminate the object with an illumination field. The illumination field can have an illumination field central axis that is angularly offset from the illuminator longitudinal axis by an angle that depends at least in part on the measured distance to the object to at least partially compensate for parallax error caused by the lateral offset between the illuminator longitudinal axis and the camera longitudinal axis. The camera can capture an image of the object while the illuminator illuminates the object with the illumination field.

20 Claims, 2 Drawing Sheets

(58) Field of Classification Search
CPC ........ H04N 23/671; G03B 3/10; G03B 13/20; G03B 13/36; G03B 15/05; G03B 2215/0567
See application file for complete search history.

(56) References Cited

U.S. PATENT DOCUMENTS

| | | | |
|---|---|---|---|
| 2012/0154537 A1* | 6/2012 | Chang | H04N 23/56 348/46 |
| 2018/0132700 A1 | 5/2018 | Ouyang et al. | |
| 2021/0311374 A1* | 10/2021 | Xiao | G03B 15/05 |
| 2021/0321041 A1 | 10/2021 | Müller et al. | |

OTHER PUBLICATIONS

"International Application Serial No. PCT/US2023/012019, Written Opinion mailed May 17, 2023", 6 pgs.

"International Application Serial No. PCT US2023 012019, International Preliminary Report on Patentability mailed Aug. 15, 2024", 7 pages.

"European Application Serial No. 21209135.9, Response to Communication Pursuant to Rules 161 and 162 EPC filed Dec. 3, 2024", 9 pages.

* cited by examiner

PARALLAX CORRECTION FOR ILLUMINATION SYSTEM AND METHOD

CLAIM OF PRIORITY

This application claims the benefit of U.S. Provisional Application No. 63/306,700, filed on Feb. 4, 2022, which is hereby incorporated by reference in its entirety.

FIELD OF THE DISCLOSURE

The present disclosure relates to an illumination system, such as for a camera.

BACKGROUND OF THE DISCLOSURE

There is ongoing effort to improve illumination systems, such as for cameras.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

Figure 1:
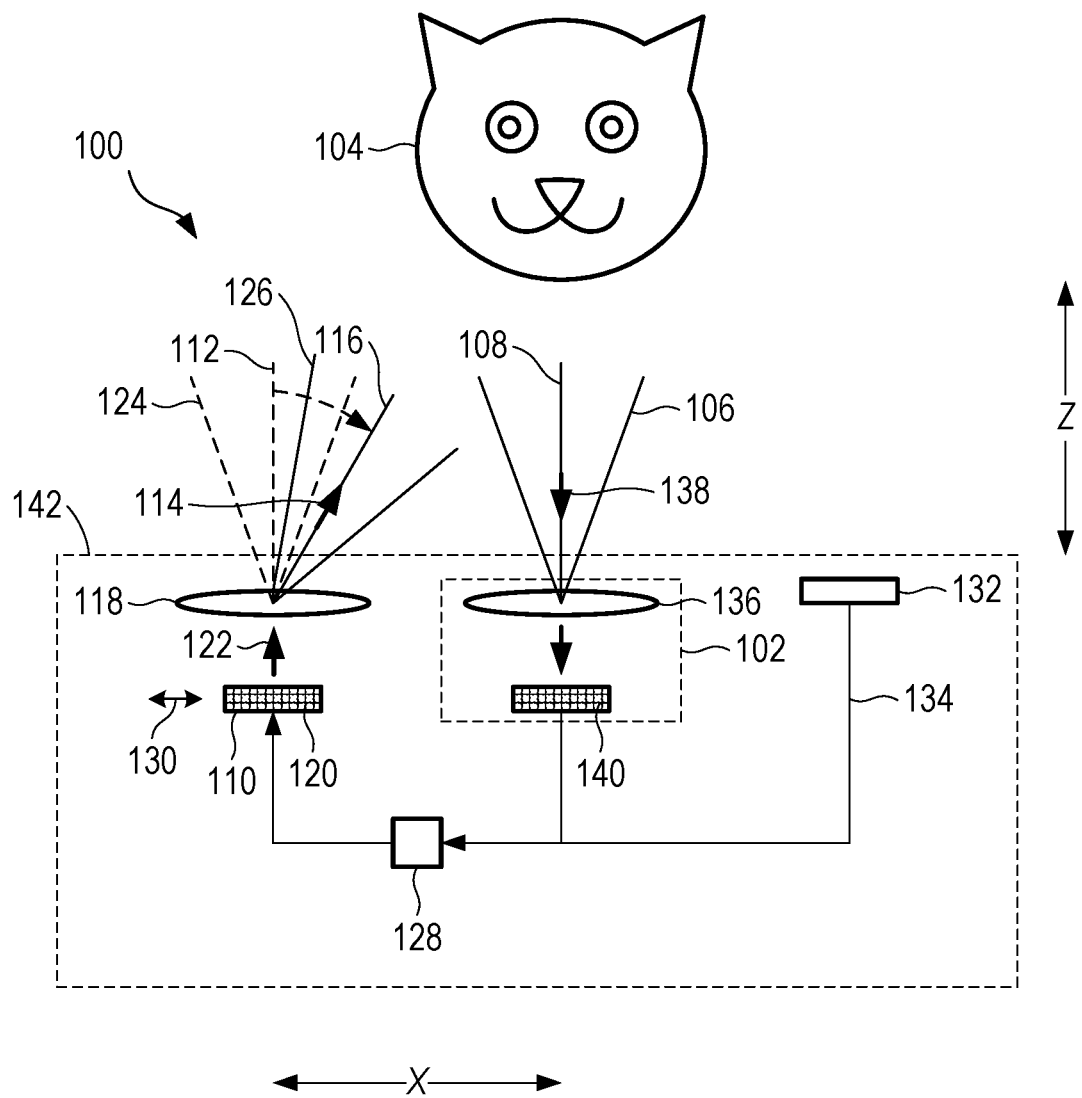
FIG. 1 shows a side view of an example of an imaging system, in accordance with some examples.

Some illumination systems, such as for a camera flash or for vehicle headlights, can vary an illuminance over an illumination field. For example, a camera flash can direct more light to objects in a scene that are relatively far from the camera, and less light to objects in the scene that are relatively close to the camera, so that both the far objects and the near objects can have suitable lighting for a captured image of the scene. As another example, vehicle headlights can dim a portion of the angular illumination field to avoid blinding drivers of oncoming vehicles. Other suitable examples and applications can also be used.

In some examples of illumination systems that can vary an illuminance over an illumination field, a lens can collimate (or at least partially focus) light from a light-emitting diode (LED) array, such as a segmented LED that has individually addressable segments that can be electrically powered independent of other segments. For the purposes of this document, the terms "LED array" and "segmented LED" are interchangeable, and the terms "LEDs" and "LED segments" are interchangeable.

The lens can direct light toward the scene, such that a particular location on the LED array can be directed in a particular angular orientation toward the scene. By varying electrical power sent to the LEDs of the LED array, the illumination system can dynamically adjust the illuminance over the illumination field. For illumination of a particular scene, the light propagating in a particular direction can correspond to a particular location in the scene. In other words, to dynamically adjust illumination intensities for locations within the scene, the illumination system can dynamically adjust electrical power sent to the various LEDs in the LED array.

Many camera-based illumination systems are aligned such that a longitudinal axis of the camera and a longitudinal axis of the illumination system are parallel, or nearly parallel to within typical manufacturing and alignment tolerances. For example, for a smart phone camera system, the longitudinal axis of the camera and the longitudinal axis of the illumination system can be laterally offset from each other by about 2 mm, about 3 mm, about 4 mm, about 5 mm, about 6 mm, about 8 mm, about 10 mm, or another suitable value. This lateral offset between the camera and the illumination system can produce a corresponding lateral offset between a field of view of the camera and an illumination field from the illuminator. Such a lateral offset is referred to as "parallax error."

Parallax error is relatively insignificant when capturing images of relatively distant objects (e.g., objects that are separated from the camera by a distance that is significantly larger than the lateral offset between the camera longitudinal axis and the illumination system longitudinal axis). For relatively distant objects, such as objects that are separated from the camera by more than 100 mm, more than 200 mm, more than 300 mm, more than 400 mm, more than 500 mm, more than 1 m, or more than another suitable value, the lateral offset of a few mm between the camera field of view and the illumination field can be ignored because the lateral offset is exceedingly small compared to a size of the illuminating beam at the distant object.

Parallax error can produce undesirable effects when capturing images of relatively close objects (e.g., objects that are separated from the camera by a distance that is less than about ten times the lateral offset between the camera longitudinal axis and the illumination system longitudinal axis). For relatively close objects, such as objects that are separated from the camera by less than 100 mm, less than 200 mm, less than 300 mm, less than 400 mm, less than 500 mm, less than 1 m, or less than another suitable value, the lateral offset of a few mm between the camera field of view and the illumination field can create problems in the illumination of the objects. For example, parallax error can cause a relatively close object to receive too much illumination on one edge of the object and not enough illumination on an opposing edge of the object.

To at least partially compensate for parallax error in an imaging system, such as between a camera and a corresponding illumination system, the imaging system can measure a distance to an object in a field of view of the camera and can cause the illumination system to angularly redirect a specified illumination pattern by an angle that depends on the measured distance.

FIG. 1 shows a side view of an example of an imaging system 100, in accordance with some examples.

A camera 102 can have a field of view 106 that includes an object 104. In FIG. 1, the object 104 is shown as being a happy cat; other suitable objects can also be used. The camera 102 can define a camera longitudinal axis 108 that extends to a center of the field of view 106.

An illuminator 110 can define an illuminator longitudinal axis 112 that is substantially parallel to the camera longitudinal axis 108 and is laterally offset from the camera longitudinal axis 108. The illuminator 110 can illuminate the object 104 with an illumination field 114. The illumination field 114 can have an illumination field central axis 116 that is angularly offset from the illuminator longitudinal axis 112 by an angle that depends at least in part on a measured distance (Z) to the object 104 to at least partially compensate for parallax error caused by the lateral offset (X) between the illuminator longitudinal axis 112 and the camera longitudinal axis 108. In some examples, the illumination field central axis 116 can extend from a center of the illuminator lens 118 to a peak illuminance in the illumination field 114. The camera 102 can capture an image of the object 104 while the illuminator 110 illuminates the object 104 with the illumination field 114.

In some examples, the illuminator 110 can include an illuminator lens 118 and a light-emitting diode (LED) array 120 disposed at or near a focal plane of the illuminator lens 118. Placement at the focal plane can result in a minimum angular spread of the illumination field 114 in the far field (e.g., far enough away from the illuminator 110 such that the illumination field 114 grows in size as a function of distance away from the illuminator 110), but can allow defects or dark regions in the LED array 120 to show up clearly in the illumination field 114. Placement near the focal plane can still allow a relatively small angular spread of the illumination field 114 in the far field, but can introduce a small amount of blurring (in angular space), such that defects or dark regions in the LED array 120 may be blurred out in the illumination field 114. The illuminator longitudinal axis 112 can extend from a center of the LED array 120 through a center of the illuminator lens 118. The LED array 120 can emit light 122 through the illuminator lens 118 to form the illumination field 114. Because the LED array 120 can be disposed at or near the focal plane of the illuminator lens 118, the illuminator lens 118 can collimate, substantially collimate, or at least partially focus the light 122 emitted from the LED array 120. For such collimated or nearly collimated light, features in translational space on the LED array 120 can correspond to features in angular space in the illumination field 114. For example, bright and dark areas of the LED array 120 can correspond to bright and dark regions in angular space emerging from the illuminator 110. For an object 104 that is relatively far from the imaging system 100, compared with distance and sizes of the elements in the imaging system 100, the bright and dark regions in angular space can correspond to bright and dark areas in an illumination pattern that the imaging system 100 projects onto the object 104. For an object 104 that is relatively close to the imaging system 100, compared with distance and sizes of the elements in the imaging system 100, the imaging system 100 can angularly redirect the illumination pattern toward the object 104 to at least partially compensate for the parallax error caused by the lateral offset (X) between the illuminator longitudinal axis 112 and the camera longitudinal axis 108. This angular redirection can pivot an illuminator field of view from a first position 124, at which the illuminator field of view is centered on the illuminator longitudinal axis 112, to a second position 126, at which the illuminator field of view is centered on the illumination field central axis 116, which is angularly offset from the illuminator longitudinal axis 112 by an angle that depends at least in part on a measured distance (Z) to the object 104. Note that the angular redirection or pivot can optionally be smaller than an angular extent of the illumination field 114, such that the redirection shifts the features of the illumination field 114 within the full angular extent of the illumination field 114, rather than angularly shifting to an angle that lies outside the full angular extent of the illumination field 114.

In some examples, the illuminator 110 can include a controller 128. The controller 128 can cause the LED array 120 to be powered such that a specified illumination pattern on the LED array 120 is laterally offset on the LED array 120 by an offset amount that depends at least in part on the measured distance (Z) to the object 104 to at least partially compensate for the parallax error. In some examples, the controller 128 can calculate the offset amount as an offset angle multiplied by the focal length of the illuminator lens 118. In some examples, the controller 128 can calculate the offset angle as an arctangent of a ratio, the ratio being the lateral offset (X) between the illuminator longitudinal axis 112 and the camera longitudinal axis 108 divided by the measured distance (Z) to the object 104. In some examples, the controller 128 can calculate the offset amount for each image captured by the imaging system 100, such that the offset amount can include a value selected from a continuous (e.g., infinite) range of values. In other examples, the controller 128 can round off the offset amount and select an offset amount from one of a specified (e.g., finite) range of values. For example, the controller 128 can determine the offset amount by selecting one of a plurality of predetermined offset amounts. Other configurations can also be used. For angular offsets that are implemented in software (e.g., such as by shifting a specified illumination pattern on the LED array 120), the pattern can be shifted by an amount that includes a fraction of a pixel on the LED array 120. In some examples, the specified illumination pattern can additionally be stretched or compressed in the lateral direction, along with the lateral shift.

As an alternative to shifting a specified illumination pattern on the LED array 120, the imaging system 100 can mechanically translate and/or tilt the LED array 120 and/or illuminator lens 118 to angularly redirect the illumination field 114. For example, an actuator 130 can translate and/or tilt the illuminator lens 118, the LED array 120, or both the illuminator lens 118 and the LED array 120. The translation can be along a direction that is orthogonal or substantially orthogonal to the illuminator longitudinal axis 112. The controller 128 can cause the actuator 130 to translate the illuminator lens 118, the LED array 120, or both the illuminator lens 118 and the LED array 120 by an offset amount that depends at least in part on the measured distance (Z) to the object 104. In some examples, the controller 128 can calculate the offset amount as an offset angle multiplied by the focal length of the illuminator lens 118. In some examples, the controller 128 can calculate the offset angle as an arctangent of a ratio, the ratio being a lateral offset between the illuminator longitudinal axis 112 and the camera longitudinal axis 108 divided by the measured distance (Z) to the object 104. In some examples, the controller 128 can determine the offset amount as one of a plurality of predetermined offset amounts. In some examples, the actuator 130 can be used in addition to shifting a specified illumination pattern on the LED array 120.

To determine the measured distance (Z) to the object 104, the imaging system 100 can include a distance sensor 132 that can dynamically measure the distance. The distance sensor 132 can include an electrical connection to the controller 128, over which the distance sensor 132 can communicate data 134 representing the measured distance (Z) to the controller 128. In some examples, the distance sensor 132 can measure a time of flight between the distance sensor 132 and the object 104 to determine the measured distance (Z) to the object 104, such as by emitting a pulse of light from a housing and measuring the time for reflected light to return to the housing, or other LIDAR-based techniques. In some examples, the distance sensor 132 can form a depth map that includes the object 104 to determine the measured distance (Z) to the object 104.

Instead of, or in addition to the distance sensor 132, the camera 102 can include an auto-focus mechanism that can determine the measured distance (Z) to the object 104. For example, a lens 136 in the camera 102 can focus light 138 reflected from the object 104 onto a multi-pixel sensor 140.

The controller 128, or another suitable controller, can measure a sharpness of the image of the object 104 at the multi-pixel sensor 140 to determine the measured distance (Z) to the object 104. Note that for auto-focus mechanisms that rely on sharpness, the distance (Z) may be calculated by the controller 128, or another suitable controller; because the distance (Z) is obtained from a measurement, for the purposes of this document, the distance (Z) is referred to as a measured distance (Z). Other suitable auto-focus mechanisms can also be used.

In some examples, the camera 102 and the illuminator 110 can be disposed on or in a housing 142. In some examples, the housing 142 can be a smart phone, a laptop, or other suitable user device. In some examples, the housing 142 can define a plane. In some examples, the illuminator longitudinal axis 112 and the camera longitudinal axis 108 can be substantially orthogonal to the plane.

Figure 2:
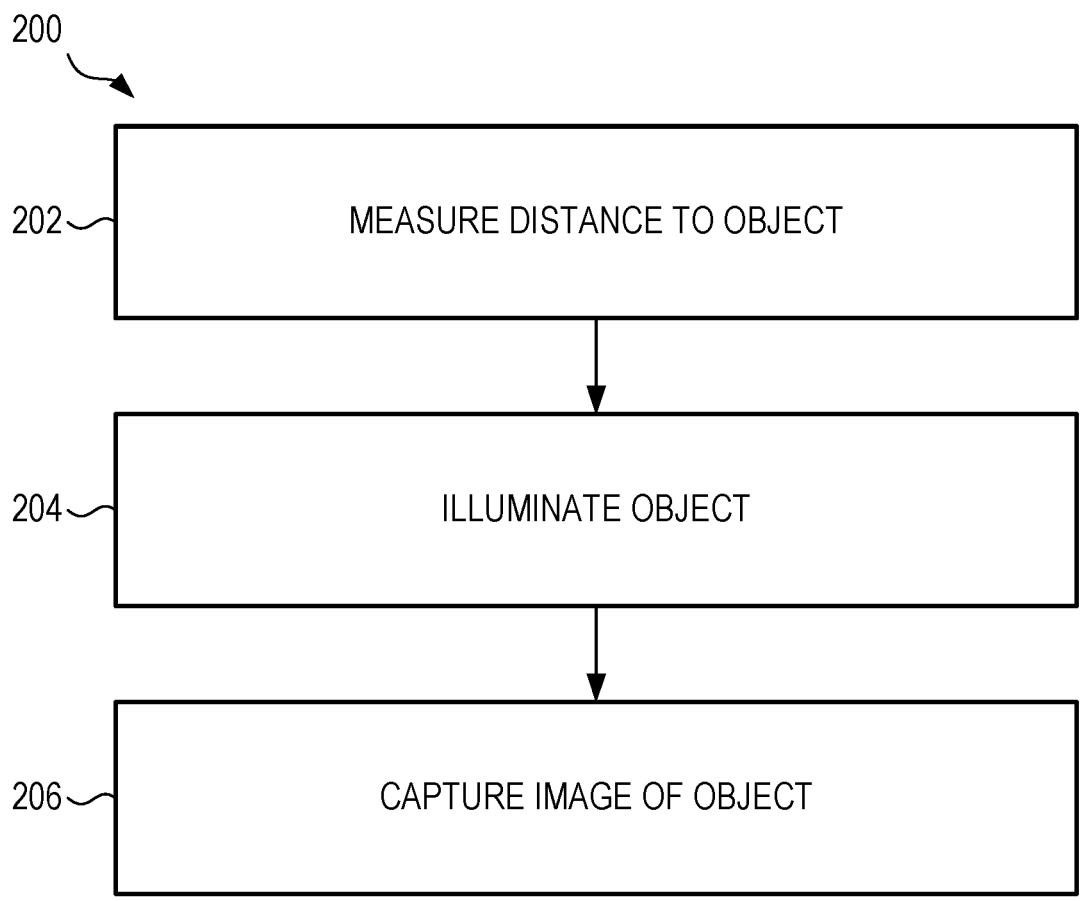
FIG. 2 shows a flowchart of an example of a method for capturing an image, in accordance with some examples.

FIG. 2 shows a flowchart of an example of a method 200 for capturing an image, in accordance with some examples. The method 200 can be executed by imaging system 100 or another imaging system. The method 200 for capturing an image is but one method for capturing an image; other suitable methods can also be used.

At operation 202, the system, such as imaging system 100, can automatically measure a distance from a housing, such as housing 142, to an object, such as object 104. The system can perform the measurement using dedicated hardware, such as distance sensor 132, or by use of an auto-focus mechanism in a camera, such as camera 102.

At operation 204, an illuminator disposed on or in the housing, such as illuminator 110, can illuminate the object with an illumination field, such as illumination field 114. The illuminator can define an illuminator longitudinal axis, such as illuminator longitudinal axis 112.

At operation 206, a camera disposed on or in the housing, such as camera 102, can capture an image of the object while the illuminator illuminates the object with the illumination field. The camera can have a field of view, such as field of view 106, that includes the object. The camera can define a camera longitudinal axis, such as camera longitudinal axis 108, that extends to a center of the field of view. The camera longitudinal axis can be parallel to the illuminator longitudinal axis and can be laterally offset from the camera longitudinal axis. The illumination field can have an illumination field central axis, such as illumination field central axis 116, that is angularly offset from the illuminator longitudinal axis by an angle that depends at least in part on the measured distance to the object to at least partially compensate for parallax error caused by the lateral offset between the illuminator longitudinal axis and the camera longitudinal axis.

In some examples, the illuminator can include an illuminator lens, such as illuminator lens 118, and an LED array, such as LED array 120, disposed at or near a focal plane of the illuminator lens. The illuminator longitudinal axis can extend from a center of the LED array through a center of the illuminator lens. The LED array can emit light through the illuminator lens to form the illumination field.

In some examples, the method 200 for can optionally further include powering the LED array such that a specified illumination pattern on the LED array is laterally offset on the LED array by an offset amount that depends at least in part on the measured distance to the object to at least partially compensate for the parallax error.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

What is claimed is:

1. An imaging system, comprising:
   a camera having a field of view that includes an object, the camera defining a camera longitudinal axis that extends to a center of the field of view; and
   an illuminator defining an illuminator longitudinal axis that is substantially parallel to the camera longitudinal axis and is laterally offset from the camera longitudinal axis, the illuminator configured to illuminate the object with an illumination field, the illumination field having an illumination field central axis that is angularly offset from the illuminator longitudinal axis by an angle that depends at least in part on a measured distance to the object to at least partially compensate for parallax error caused by the lateral offset between the illuminator longitudinal axis and the camera longitudinal axis,
   the camera configured to capture an image of the object while the illuminator illuminates the object with the illumination field.

2. The imaging system of claim 1, wherein the illuminator includes an illuminator lens and a light-emitting diode (LED) array disposed at or near a focal plane of the illuminator lens, the illuminator longitudinal axis extending from a center of the LED array through a center of the illuminator lens, the LED array configured to emit light through the illuminator lens to form the illumination field.

3. The imaging system of claim 2, further comprising:
   a controller configured to cause the LED array to be powered such that a specified illumination pattern on the LED array is laterally offset on the LED array by an offset amount that depends at least in part on the measured distance to the object to at least partially compensate for the parallax error.

4. The imaging system of claim 3, wherein the controller is configured to calculate the offset amount as an offset angle multiplied by a focal length of the illuminator lens.

5. The imaging system of claim 4, wherein the controller is configured to calculate the offset angle as an arctangent of a ratio, the ratio being a lateral offset between the illuminator longitudinal axis and the camera longitudinal axis divided by the measured distance to the object.

6. The imaging system of claim 4, wherein the controller is configured to determine the offset amount by selecting one of a plurality of predetermined offset amounts.

7. The imaging system of claim 2, further comprising:
   an actuator configured to translate the illuminator lens; and
   a controller configured to cause the actuator to translate the illuminator lens by an offset amount that depends at least in part on the measured distance to the object.

8. The imaging system of claim 7, wherein the controller is configured to calculate the offset amount as an offset angle multiplied by a focal length of the illuminator lens.

9. The imaging system of claim 8, wherein the controller is configured to calculate the offset angle as an arctangent of a ratio, the ratio being a lateral offset between the illuminator longitudinal axis and the camera longitudinal axis divided by the measured distance to the object.

10. The imaging system of claim 8, wherein the controller is configured to determine the offset amount as one of a plurality of predetermined offset amounts.

11. The imaging system of claim 1, further comprising:
a distance sensor configured to measure a time of flight between the distance sensor and the object to determine the measured distance to the object.

12. The imaging system of claim 1, further comprising:
a distance sensor configured to form a depth map that includes the object to determine the measured distance to the object.

13. The imaging system of claim 1, wherein the camera includes an auto-focus mechanism that is configured to determine the measured distance to the object.

14. The imaging system of claim 1, wherein:
the camera and the illuminator are disposed on or in a housing;
the housing defines a plane; and
the illuminator longitudinal axis and the camera longitudinal axis are substantially orthogonal to the plane.

15. A method for capturing an image, the method comprising:
automatically measuring a distance from a housing to an object;
illuminating, from an illuminator disposed on or in the housing, the object with an illumination field, the illuminator defining an illuminator longitudinal axis;
capturing, with a camera disposed on or in the housing, an image of the object while the illuminator illuminates the object with the illumination field, the camera having a field of view that includes the object, the camera defining a camera longitudinal axis that extends to a center of the field of view, the camera longitudinal axis being parallel to the illuminator longitudinal axis and being laterally offset from the camera longitudinal axis,
the illumination field having an illumination field central axis that is angularly offset from the illuminator longitudinal axis by an angle that depends at least in part on the measured distance to the object to at least partially compensate for parallax error caused by the lateral offset between the illuminator longitudinal axis and the camera longitudinal axis.

16. The method of claim 15, wherein the illuminator includes an illuminator lens and a light-emitting diode (LED) array disposed at or near a focal plane of the illuminator lens, the illuminator longitudinal axis extending from a center of the LED array through a center of the illuminator lens, the method further comprising:
emitting light, from the LED array, through the illuminator lens to form the illumination field.

17. The method of claim 16, further comprising:
powering the LED array such that a specified illumination pattern on the LED array is laterally offset on the LED array by an offset amount that depends at least in part on the measured distance to the object to at least partially compensate for the parallax error.

18. An imaging system, comprising:
a housing defining a plane;
a camera disposed in or on the housing, the camera having a field of view that includes an object, the camera defining a camera longitudinal axis that extends to a center of the field of view, the camera longitudinal axis being orthogonal to the plane;
a light-emitting diode (LED) array disposed in the housing and being substantially parallel to the plane, the LED array configured to emit light;
an illuminator lens configured to at least partially focus the emitted light to form an illumination field and direct the illumination field toward the object, the illuminator defining an illuminator longitudinal axis that extends from a center of the LED array through a center of the lens, the illuminator longitudinal axis being orthogonal to the plane and laterally offset from the camera longitudinal axis;
a controller configured to:
determine a lateral offset that depends on a measured distance to the object; and
cause the LED array to be powered in a specified pattern, the specified pattern being laterally offset on the LED array by the determined lateral offset to at least partially compensate for parallax error caused by the lateral offset between the illuminator longitudinal axis and the camera longitudinal axis.

19. The imaging system of claim 18, further comprising:
a distance sensor configured to measure a time of flight between the distance sensor and the object to determine the measured distance to the object.

20. The imaging system of claim 18, wherein the camera includes an auto-focus mechanism that is configured to determine the measured distance to the object.

* * * * *